(12) United States Patent
Kwon et al.

(10) Patent No.: US 11,483,059 B2
(45) Date of Patent: Oct. 25, 2022

(54) INTERFERENCE CANCELLATION REPEATER AND OPERATING METHOD THEREOF

(71) Applicants: SOLiD, INC., Seongnam-si (KR); FOUNDATION OF SOONGSIL UNIVERSITY—INDUSTRY COOPERATION, Seoul (KR)

(72) Inventors: Nagwon Kwon, Gyeonggi-do (KR); Hyunchae Kim, Gyeonggi-do (KR); Chonghoon Kim, Seoul (KR)

(73) Assignees: SOLiD, INC., Seongnam-si (KR); FOUNDATION OF SOONGSIL UNIVERSITY—INDUSTRY COOPERATION, Seoul (KR)

( * ) Notice: Subject to any disclaimer, the term of this patent is extended or adjusted under 35 U.S.C. 154(b) by 0 days.

(21) Appl. No.: 16/991,512

(22) Filed: Aug. 12, 2020

(65) Prior Publication Data

US 2021/0050908 A1 Feb. 18, 2021

(30) Foreign Application Priority Data

Aug. 13, 2019 (KR) .................. 10-2019-0099119
Jun. 29, 2020 (KR) .................. 10-2020-0078996

(51) Int. Cl.
| | | |
|---|---|---|
| H04B 3/36 | (2006.01) | |
| H04B 7/17 | (2006.01) | |
| H04L 25/20 | (2006.01) | |
| H04L 25/52 | (2006.01) | |
| H04B 7/155 | (2006.01) | |
| H04L 5/14 | (2006.01) | |
| H04J 3/02 | (2006.01) | |

(52) U.S. Cl.
CPC .......... H04B 7/15585 (2013.01); H04J 3/025 (2013.01); H04L 5/14 (2013.01)

(58) Field of Classification Search
CPC ..... H04B 7/15585; H04L 5/14; H04L 5/0007; H04J 3/025
USPC ............ 375/211, 350, 346, 229, 232; 455/7; 370/279
See application file for complete search history.

(56) References Cited

U.S. PATENT DOCUMENTS

| | | | | |
|---|---|---|---|---|
| 2010/0177668 A1* | 7/2010 | Ahn | .................... | H04B 7/15585 370/279 |
| 2012/0115412 A1* | 5/2012 | Gainey | ................. | H04L 5/0007 455/7 |

* cited by examiner

*Primary Examiner* — Phuong Phu
(74) *Attorney, Agent, or Firm* — Sughrue Mion, PLLC

(57) ABSTRACT

A method of operating a TDD-based interference cancellation repeater, the method comprises setting a compensation gain of a gain compensator differently in an uplink communication period and a downlink communication period, setting an optimal coefficient of an adaptive filter in the uplink communication period and an optimal coefficient of the adaptive filter in the downlink communication period the same, based on the set compensation gain of the gain compensator and removing an interference signal in the uplink communication period or the downlink communication period according to the set optimal coefficient of the adaptive filter.

15 Claims, 5 Drawing Sheets

INTERFERENCE CANCELLATION REPEATER AND OPERATING METHOD THEREOF

BACKGROUND

1. Field

The disclosure relates to an interference cancellation repeater and a method of operation thereof, and more particularly, to an interference cancellation repeater capable of removing an interference signal using an optimal coefficient of the same adaptive filter in an uplink communication period and a downlink communication period by setting a compensation gain of a gain compensator differently in the uplink communication period and the downlink communication period, and a method of operating the interference cancellation repeater.

2. Description of the Related Art

One of important advantages of a time division duplex (TDD) wireless communication system is that channel information estimation in uplink communication may be used in downlink communication by using channel reciprocity derived from reciprocity theorem of Electromagnetics. However, in practice, there is a problem in that channel information obtainable by using reciprocity is deteriorated due to mismatch of RF stages of a transceiver. Therefore, sophisticated correction of different characteristics of the RF stages of the transceiver is required.

The disclosure relates to results of implementation of "Development of high-power, high-efficiency, low-latency, and dual-mode (WiBro and TD-LTE) cell coverage extension device using a same frequency retransmission method using interference signal cancellation technology in TICN wireless networks (Civil-Military task number UM17408RD4)" of Institute of Civil-Military Technology Cooperation.

SUMMARY

Provided are an interference cancellation repeater capable of removing an interference signal using an optimal coefficient of the same adaptive filter in an uplink communication period and a downlink communication period by setting a compensation gain of a gain compensator differently in the uplink communication period and the downlink communication period, and a method of operating the interference cancellation repeater.

According to an aspect of an embodiment, a method of operating a TDD-based interference cancellation repeater, the method comprises setting a compensation gain of a gain compensator differently in an uplink communication period and a downlink communication period, setting an optimal coefficient of an adaptive filter in the uplink communication period and an optimal coefficient of the adaptive filter in the downlink communication period the same, based on the set compensation gain of the gain compensator and removing an interference signal in the uplink communication period or the downlink communication period according to the set optimal coefficient of the adaptive filter.

According to an aspect of an embodiment, the setting of the compensation gain of the gain compensator differently may comprises setting the gain of the gain compensator as 1, in any one of the uplink communication period and the downlink communication period and setting the gain of the gain compensator according to a gain ratio of a first gain corresponding to the overall gain of an uplink communication path and a second gain corresponding to the overall gain of a downlink communication path, in the other of the uplink communication period and the downlink communication period.

According to an aspect of an embodiment, an output signals of the adaptive filter in the uplink communication period and the downlink communication period may be the same According to an aspect of an embodiment, the method may further comprises tracking the gain ratio of the changing first gain and the second gain.

According to an aspect of an embodiment, the tracking of the gain ratio may comprises calculating the difference in gain ratio between a first gain ratio compensated by the interference cancellation repeater and a second gain ratio changed according to the environment of the interference cancellation repeater, and tracking the gain ratio using the difference in gain ratio.

According to an aspect of an embodiment, the tracking of the gain ratio may comprises tracking the gain ratio using fixed point iteration.

According to an aspect of an embodiment, the fixed point iteration may be performed by reflecting a convergence constant on the difference in gain ratio, According to an aspect of an embodiment, the convergence constant may have a value greater than 0 and less than 1.

According to an aspect of an embodiment, the fixed point iteration may be performed by using a coefficient vector at a point at which the uplink communication period ends and a coefficient vector at a point at which the downlink communication period ends.

According to an aspect of an embodiment, a coefficient vector of the previous communication period among the uplink communication period or the downlink communication period may be stored and used.

According to an aspect of an embodiment, the fixed point iteration may be performed by selecting only a coefficient vector corresponding to a direct-feedback signal and using the selected coefficient vector.

According to an aspect of an embodiment, the tracking of the gain ratio and the setting of the compensation gain of the gain compensator differently may be performed during a guard period existing between the uplink communication period and the downlink communication period.

According to an aspect of an embodiment, a TDD-based interference cancellation repeater comprises a controller configured to set a compensation gain of a gain compensator differently in an uplink communication period and a downlink communication period, and to set an optimal coefficient of an adaptive filter in the uplink communication period and an optimal coefficient of the adaptive filter in the downlink communication period the same based on the set compensation gain of the gain compensator and a subtractor configured to remove an interference signal in the uplink communication period or the downlink communication period according to the set optimal coefficient of the adaptive filter.

According to an aspect of an embodiment, the interference cancellation repeater may further comprises an adaptive filter generating a predicted interference signal according to the set optimal coefficient of the adaptive filter, wherein the subtractor subtracts the predicted interference signal from an uplink communication signal or a downlink communication signal.

According to an aspect of an embodiment, the controller may set the compensation gain and the optimal coefficient of the adaptive filter based on synchronization information detected by a sync detector.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
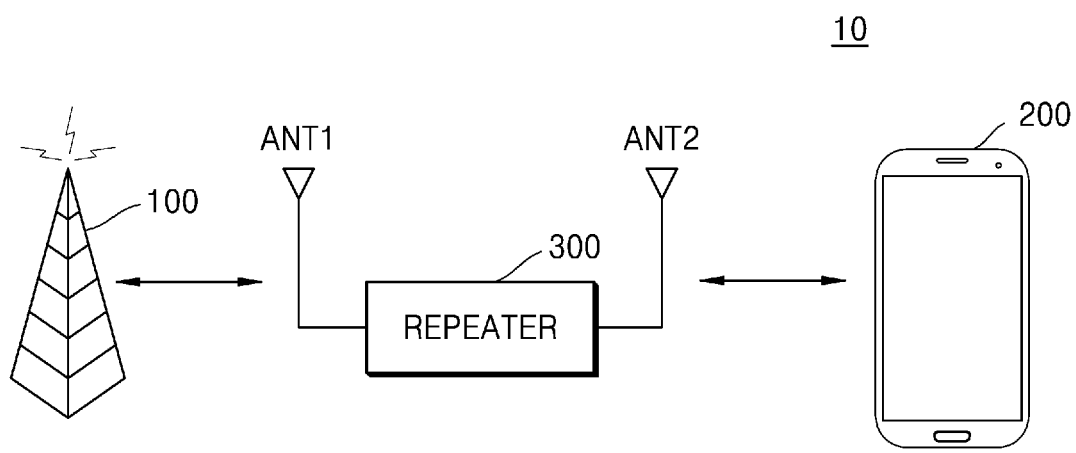
FIG. 1 is a conceptual diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system 10 according to an embodiment.

Referring to FIG. 1, the communication system 10 according to an embodiment may include a base station 100, a wireless communication terminal 200, and a repeater 300.

The repeater 300 may relay communication between the base station 100 and the wireless communication terminal 200.

According to an embodiment, the repeater 300 may relay a communication signal in a communication network composed of a 2G mobile communication network such as a global system for mobile communication (GSM) or code division multiple access (CDMA), a 3G mobile communication network such as wideband code division multiple access (WCDMA) or CDMA2000, a 3.5G mobile communication network such as high speed downlink packet access (HSDPA) or high speed uplink packet access (HSUPA), a 4G mobile communication network such as long term evolution (LTE) or LTE-Advanced, a 5G mobile communication network, a cloud radio access network (C-RAN), a 6G mobile communication network, or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal).

The first antenna ANT1 may be referred to as a donor antenna and the second antenna ANT2 may be referred to as a service antenna or a coverage antenna, but are not limited thereto.

According to an embodiment, the repeater 300 may be implemented as an interference cancellation system (ICS) repeater.

According to an embodiment, the repeater 300 may operate based on a time division duplex (TDD).

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

Detailed structure and operation of the repeater 300 will be described in detail with reference to FIG. 2.

Figure 2:
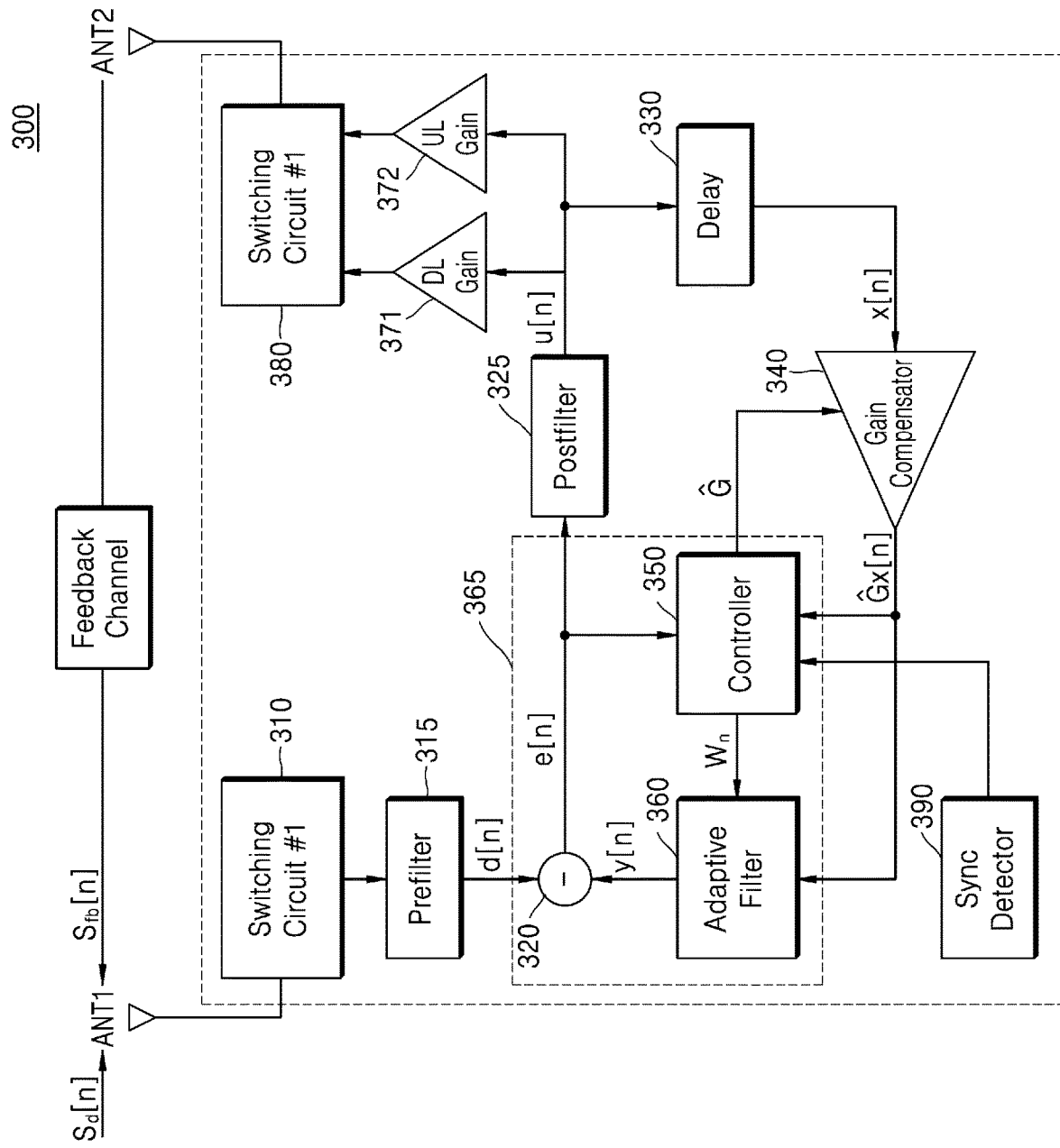
FIG. 2 is a block diagram according to an embodiment of a repeater shown in FIG. 1.
Figure 3:
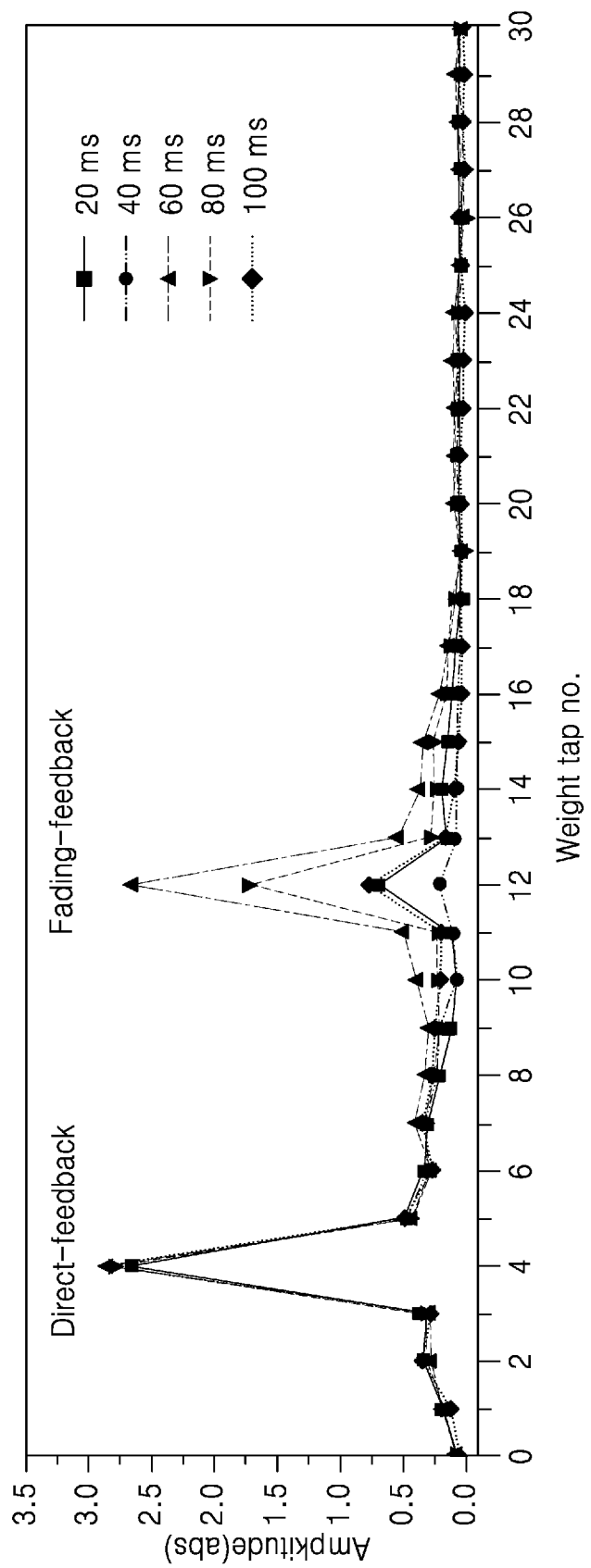
FIG. 3 is a graph showing a coefficient vector that may be used in a method of operating a repeater according to an embodiment.
Figure 4:
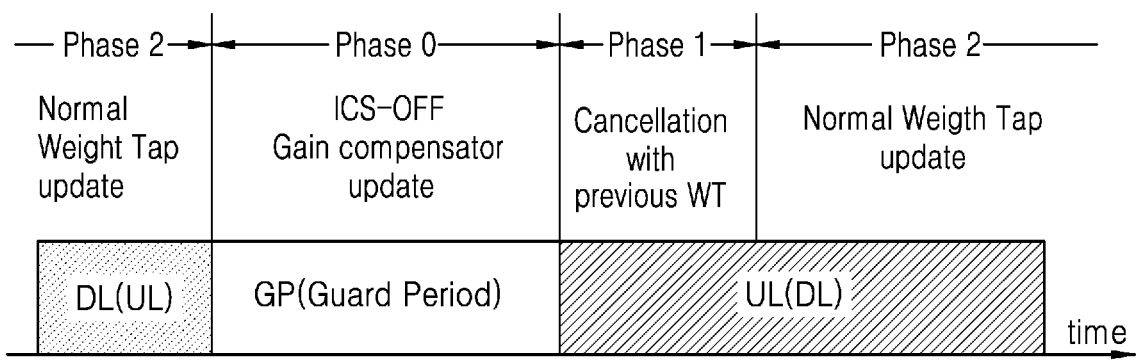
FIG. 4 is a view for explaining an operation state of each TDD period of the repeater shown in FIG. 2.

FIG. 2 is a block diagram according to an embodiment of the repeater shown in FIG. 1. FIG. 3 is a graph showing a coefficient vector that may be used in a method of operating a repeater according to an embodiment. FIG. 4 is a view for explaining an operation state of each TDD period of the repeater shown in FIG. 2.

For convenience of description, FIG. 2 mainly shows configurations of a repeater used for downlink communication, and the repeater 300 may additionally include configurations corresponding to uplink communication.

Referring to FIGS. 1 and 2, the repeater 300 may include a first antenna ANT1, a second antenna ANT2, a first switching circuit 310, a prefilter 315, a subtractor 320, a postfilter 325, a delay 330, a gain compensator 340, a controller 350, an adaptive filter 360, a downlink gain part 371, an uplink gain part 372, a second switching circuit 380, and a sync detector 390.

The first antenna ANT1 may receive a downlink communication signal received from the base station 100 and a feedback signal output from the second antenna ANT2 and received through a feedback channel (i.e., interference signal).

The repeater 300 may further include an analog-to-digital converter (ADC) that converts the received downlink communication signal and feedback signal.

In FIG. 2, an ADC process is omitted for convenience of explanation, and the first antenna ANT1 receives digital signals Sd[n] and Sfb[n] directly. However, the digital signals Sd[n] and Sfb[n] may refer to signals in which an RF signal received from the base station 100 and an RF signal received from the second antenna ANT2 are digitally converted, respectively.

In this specification, "digital signal" may broadly mean a digitized signal regardless of its shape, and may mean a concept including a complex baseband digital signal.

The downlink gain 371 means an equivalent circuit representing the overall gain of a downlink communication path, and its value is defined as $\tilde{G}_d$, and the uplink gain 372 means an equivalent circuit representing the overall gain of an uplink communication path, and its value is defined as $\tilde{G}_u$.

When the feedback channel is $\tilde{h}[n]$, the overall gain of the downlink communication path is $\tilde{G}_d$, and the overall gain of the uplink communication path is $\tilde{G}_u$, an output u[n] and the feedback signal Sfb[n] of the repeater 300 in a digital domain before being converted into an RF signal may have a relationship as in Equation 1 below.

$$s_{fb}[n] = \begin{cases} \tilde{G}_d \tilde{h}[n] * u[n] & (DL) \\ \tilde{G}_u \tilde{h}[n] * u[n] & (UL) \end{cases} \quad \text{(Equation 1)}$$

The first switching circuit 310 and the second switching circuit 380 may switch a path of a communication signal in the repeater 300 operating based on a TDD.

According to an embodiment, the first switching circuit 310 and the second switching circuit 380 may switch a signal transmission path such that a communication signal received through the first antenna ANT1 in a downlink communication period is transmitted to the second antenna ANT2 through a path through at least some of the components 315 to 380 illustrated in FIG. 2.

According to another embodiment, the first switching circuit 310 and the second switching circuit 380 may switch a signal transmission path such that a communication signal received through the second antenna ANT2 in an uplink communication period is transmitted to the first second antenna ANT1 through a path through at least some of the components 315 to 380 illustrated in FIG. 2.

FIG. 2, for convenience of description, mainly shows a first path of a signal in which the first switching circuit 310 and the second switching circuit 380 are switched and connected to each other in the downlink communication period. At least some of the components illustrated in FIG. 2 may also be included in a second path for transmitting a signal in the uplink communication period.

The prefilter 315 may refer to an equivalent circuit showing characteristics and delays of all filters until an RF signal input through the first antenna ANT1 of the repeater 300 is transmitted to a reference point (e.g., the subtractor 320).

The postfilter 325 may refer to an equivalent circuit showing characteristics and delays of all filters until a communication signal output after the reference point (e.g., the subtractor 320) is transmitted to the second antenna ANT2.

The downlink communication signal through the prefilter 315 may be represented by d[n]. The subtractor 320 may subtract a predicted interference signal y[n] output from the adaptive filter 360 from a downlink communication signal d[n] including an interference signal to output an interference canceled downlink communication signal e[n].

When a coefficient vector of the adaptive filter 360 having the number of filter taps N is w, an output of the adaptive filter 360 for a vector $x_n=[x[n] \ldots x[n-N+1]]^T$ consisting of a signal x[n] delayed by u[n] by the delay 330 may be determined according to the following Equation 2.

$$y[n] = \hat{G} w^H x_n \quad \text{(Equation 2)}$$

In the above Equation 2, $\hat{G}$ may refer to a gain of the gain compensator 340. The gain compensator 340 may apply and output the gain of $\hat{G}$ to the input signal x[n].

According to an embodiment, the adaptive filter 360 may be implemented as a digital filter or an analog filter using a coefficient adaptive algorithm.

The controller 350, using the interference canceled downlink communication signal e[n], may obtain an optimal coefficient wd of the downlink communication period and an optimal coefficient wu of the uplink communication period of the adaptive filter 360 represented by Equation 4 according to a relationship of a cost function in the following Equation 3.

$$E[x_n e^*[n]] = E[x_n(s[n]+s_{fb}[n]-y[n])^*] = 0 \quad \text{(Equation 3)}$$

In Equation 3, Xn may be a signal input to the gain compensator 340, e[n] may be an interference canceled downlink communication signal output from the subtractor 320. In addition, in Equation 3, s[n] is sd[n] in the downlink communication period and su[n] in the uplink communication period. In Equation 3, y[n] may be a predicted interference signal output from the adaptive filter 360.

$$w_d = \left(\frac{\tilde{G}_d}{\hat{G}}\right)^* R^{-1} p, \; w_u = \left(\frac{\tilde{G}_u}{\hat{G}}\right)^* R^{-1} p \quad \text{(Equation 4)}$$

In Equation 4, a covariance matrix R and a correlation vector p may be expressed according to Equation 5 below.

$$R = E[x_n x_n^H]$$

$$p = E[x_n(h[n]*u[n])^*] \quad \text{(Equation 5)}$$

According to an embodiment, a process of calculating an optimal coefficient wn according to the above Equation 3 and Equation 4 may be performed by the controller 350. The optimal coefficient wn may be the optimal coefficient wd of the downlink communication period or the optimal coefficient wu of the uplink communication period.

When a relationship between wd and wu is obtained using Equation 4 and Equation 5, the relationship may be expressed according to the following Equation 6.

$$w_u^H = \frac{\tilde{G}_u}{\tilde{G}_d} w_d^H \quad \text{(Equation 6)}$$

In the above Equation 6, $\tilde{G}_u/\tilde{G}_d$ may be defined as a gain ratio.

According to an embodiment, an adaptive algorithm for calculating an optimal coefficient in the controller 350 may use a linear least squares estimation method.

According to an embodiment, a process of generating the predicted interference signal y[n] using the optimal coefficient wn transmitted from the controller 350 may be performed by the adaptive filter 360.

The controller 350 may set a compensation gain of the gain compensator 340 to different values in the uplink communication period and the downlink communication period.

According to an embodiment, the controller 350 may set the compensation gain of the gain compensator 340 according to the following Equation 7.

$$\hat{G} = \begin{cases} 1 & (DL) \\ \rho & (UL) \end{cases}, \rho = \frac{\tilde{G}_u}{\tilde{G}_d} \quad \text{(Equation 7)}$$

According to an embodiment, the controller 350 may select the compensation gain as 1 in any one (e.g., the downlink communication period) of the uplink communication period and the downlink communication period, and may select the compensation gain as a gain ratio (ρ) of the gain ($\tilde{G}_u$) corresponding to the overall gain of the uplink communication path and the gain ($\tilde{G}_d$) corresponding to the overall gain of the downlink communication path in the other (e.g., the uplink communication period) of the uplink communication period and the downlink communication period, according to Equation 7.

According to setting of the compensation gain as in Equation 7 above, the optimal coefficients wd and wu of the adaptive filter 360 may have the same value as those of the optimal coefficient wu in the uplink communication period and the optimal coefficient wd in the downlink communication period according to Equation 4. Accordingly, an adaptation algorithm in the uplink communication period makes the same channel estimation as in the downlink communication period, so that the coefficient vector may not change. Accordingly, the adaptive filter 360 may output the same output signal from the uplink communication period and the downlink communication period.

The gain ratio ($\tilde{G}_u/\tilde{G}_d$) changes according to the environment (e.g. temperature, deterioration, etc.) of the repeater, and according to an embodiment, the controller 350 may track the changing gain ratio.

According to an embodiment, the controller 350 may track the changing gain ratio using the following Equation 8 to Equation 11.

$$w_u^H = \frac{\tilde{G}_d}{\rho_0 \tilde{G}_u} w_d^H = \frac{\rho_t}{\rho_0} w_d^H \quad \text{(Equation 8)}$$

In the above Equation 8, $\rho_0$ may be a current value of the gain ratio (i.e., a first profit ratio currently being compensated), $\rho_t$ may be a true value of the changed gain ratio (i.e., a second profit ratio ($\rho_t = \tilde{G}_u/\tilde{G}_d$) changed according to the environment), and when the difference between the true value and the current value of the gain ratio is expressed again, it can be expressed as Equation 9.

$$\Delta\rho = \rho_t - \rho_0 = \left(\frac{w_u^H w_d}{w_d^H w_d} - 1\right)\rho_0 \quad \text{(Equation 9)}$$

The controller 350 may apply a convergence constant α to the difference in gain ratio of Equation 9 above to perform fixed point iteration as shown in Equation 10 below.

$$\rho_{n+1} = \rho_n + \alpha\Delta\rho_n, \Delta\rho_n = \left(\frac{w_u^H w_d}{w_d^H w_d} - 1\right)\rho_n \quad \text{(Equation 10)}$$

According to an embodiment, in Equation 10, the convergence constant α may have a value greater than 0 and less than 1.

According to an embodiment, the controller 350 may perform an operation according to the fixed point iteration method of Equation 10 using a coefficient vector wd in the downlink communication period at the time when the downlink communication period ends and a coefficient vector wu in the uplink communication period at the time when the uplink communication period ends.

According to an embodiment, the controller 350 may store and use a coefficient vector of the previous communication period in a memory (not shown) among the uplink communication period or the downlink communication period.

When coefficients used in an $n^{th}$ algorithm according to the fixed-point iteration method of Equation 10 are wd(n) and wd(n), they may be expressed as Equation 11 below.

$$w_d(n) = w_o + \Delta w_d(n)$$

$$w_u(u) = (\tilde{\rho}/\rho_n)^* w_o + \Delta w_d(u) \quad \text{(Equation 11)}$$

In the above Equation 11, $\rho_n$ is a gain ratio calculated in the execution of the $n^{th}$ algorithm, $\tilde{\rho}$ is a true value of the gain ratio, wo is Wiener solution, and $\Delta w_u(n)$ and $\Delta w_d(n)$ are random variables representing errors in an adaptive algorithm and assumed to be uncorrelated with each other.

When an expected value of $\Delta\rho_n$ n in Equation 10 is obtained using Equation 11, it may be expressed as Equation 12 below.
(Equation 12)

$$E\{\Delta\rho_n\} = \lambda\tilde{\rho} - \rho_n,$$

$$\text{where } \lambda = \frac{|w_o|^2}{|w_o|^2 + E\{|\Delta w_d(n)|^2\}}$$

When Equation 10 is calculated using the expected value of Equation 12 above, the following Equation 13 may be obtained, and when the convergence constant α has a value greater than 0 and less than 1, $\rho_n$ may converge to $\tilde{\rho}$, which is a true value of the gain ratio.

$$\rho_n = (1-\alpha)^n \rho_0 + \lambda\tilde{\rho}(1-(1-\alpha)^n) \quad \text{(Equation 13)}$$

According to an embodiment, according to the quality of service (QoS) of the repeater 300, a value of the convergence constant α may be set.

According to an embodiment, the subtractor 320, the controller 350, and the adaptive filter 360 may be implemented as one processor 365. For example, the processor 365 may be implemented as a processor in the form of an application specific integrated circuit (ASIC) or a field programmable gate array (FPGA).

Referring to FIG. 3 together, the controller 350 selects and uses only a coefficient vector corresponding to a direct-feedback signal received as a straight line distance between the two antennas ANT1 and ANT2 when performing the fixed point iteration method.

As shown in FIG. 3, the direct-feedback signal has a time-invariant characteristic because there is little change in its value while the time is changed from 20 ms to 100 ms, and exists at the front of the coefficient vector (e.g., coefficient tap number 0 to 6) and is easy to select sequentially.

According to an embodiment, when a direct-feedback signal does not exist according to characteristics of the repeater 300, a coupler may be provided between the antennas ANT1 and ANT2 of the repeater 300 to artificially generate a direct-feedback signal.

Referring to FIG. 4 together, first operation (phase 0) may be performed in a guard period (GP) existing between a downlink communication period (or uplink communication period) and an uplink communication period (or downlink communication period).

In the first operation (phase 0), an adaptive algorithm may be stopped and output data may be reset. Accordingly, an unnecessary output due to transient response of a digital filter or the like during the guard period may be eliminated.

In the first operation (phase 0), the operation of Equation 10 is performed from the most recent coefficient vectors wd and wu, and a gain ratio may be updated according to Equation 7.

In addition, depending on whether the next period is an uplink communication period or a downlink communication period, a compensation gain of a gain compensator 230 according to Equation 7 may be selected.

The second operation (phase 1) may be performed during the uplink communication period (or downlink communication period).

In the second operation (phase 1), after a first signal returns to direct-feedback, interference cancellation may be performed using a coefficient vector of a previous communication period until enough signal samples (e.g., x[n]) are accumulated to perform the adaptive algorithm.

In third operation (phase 2), the adaptive algorithm may be performed from the time when sufficient signal samples (e.g., x[n]) necessary for performing the adaptive algorithm are accumulated according to the second operation (phase 1) during the uplink communication period (or downlink communication period).

The sync detector 390 may detect synchronization information from a downlink communication signal or an uplink communication signal.

The sync detector 390 may transmit the detected synchronization information to the controller 350. The controller 350 may determine which communication period of the uplink communication period, the guard period, and the downlink communication period, based on the received synchronization information, and may set or update a compensation gain of the gain compensator 340 and an optimal coefficient of the adaptive filter 360 according to the determined communication period.

According to an embodiment, the synchronization information may include information about an uplink-downlink configuration.

Figure 5:
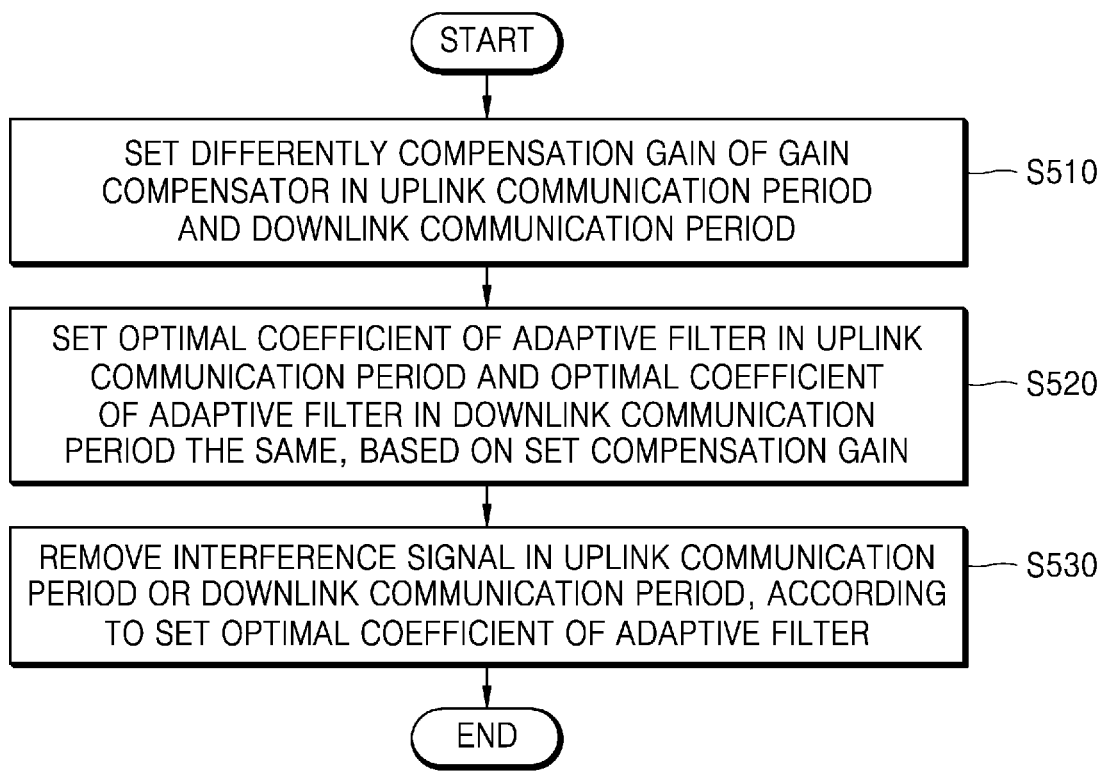
FIG. 5 is a flowchart of a method of operating a repeater according to an embodiment.

FIG. 5 is a flowchart of a method of operating the repeater 300 according to an embodiment.

Referring to FIGS. 1 to 5, in operation S510, the repeater 300 may set differently a compensation gain of a gain compensator (e.g., 340) in an uplink communication period and a downlink communication period.

According to an embodiment, the controller 350 may select the compensation gain as 1 in any one of the uplink communication period and the downlink communication period, and may select the compensation gain as the gain ratio ($\rho$) of the gain ($\tilde{G}u$) corresponding to the overall gain of the uplink communication path and the gain ($\tilde{G}d$) corresponding to the overall gain of the downlink communication path in the other of the uplink communication period and the downlink communication period.

In operation S520, the repeater 300 may set an optimal coefficient of the adaptive filter 360 in the uplink communication period and an optimal coefficient of the adaptive filter 360 in the downlink communication period the same based on the compensation gain set in operation S510.

According to an embodiment, the controller 350 may track a gain ratio whose value changes according to the environment of the repeater (e.g., temperature, deterioration, etc.), and may set a compensation gain of a gain compensator 130 using the tracked gain ratio. In addition, the controller 350 may perform an adaptive algorithm according to the set compensation gain of the gain compensator 130.

In operation S530, the repeater 300 may remove an interference signal in the uplink communication period or the downlink communication period according to the optimal coefficient of the adaptive filter 360 set in operation S520.

According to an embodiment, the subtractor 320 may subtract the predicted interference signal y[n] from a received signal (e.g., d[n]) to output the interference canceled downlink communication signal e[n].

According to an interference cancellation repeater and a method of operation thereof according to an embodiment, by setting a compensation gain of a gain compensator in an uplink communication period and a downlink communication period differently in a TDD-based interference cancellation repeater, an optimum coefficient of an adaptive filter may be set identically using one adaptive algorithm regardless of whether it is the uplink communication period or the downlink communication period. In addition, according to an interference cancellation repeater and an operating method thereof according to an embodiment, a stable operation of the interference canceling repeater is possible by setting a compensation gain of a gain compensator by utilizing a gain ratio that has a relatively slow rate of change compared to other parameters.

Hereinabove, the disclosure has been described with reference to the preferred embodiments. However, it will be appreciated by one of ordinary skill in the art that various modifications and changes of the disclosure can be made without departing from the spirit and the scope of the inventive concept which are defined in the appended claims and their equivalents.

What is claimed is:

1. A method of operating a TDD-based interference cancellation repeater, the method comprising:

setting a compensation gain of a gain compensator differently in an uplink communication period and a downlink communication period, based on a gain ratio between a first gain corresponding to an overall gain of an uplink communication path and a second gain corresponding to an overall gain of a downlink communication path;

setting an optimal coefficient of an adaptive filter in the uplink communication period and an optimal coefficient of the adaptive filter in the downlink communication period the same, based on the set compensation gain of the gain compensator; and removing an interference signal in the uplink communication period or the downlink communication period according to the set optimal coefficient of the adaptive filter.

2. The method of claim 1, wherein the setting of the compensation gain of the gain compensator differently comprises:

setting the gain of the gain compensator as 1, in any one of the uplink communication period and the downlink communication period; and setting the gain of the gain compensator according to the gain ratio between the first gain corresponding to the overall gain of the uplink communication path and the second gain corresponding to the overall gain of the downlink communication path, in the other of the uplink communication period and the downlink communication period.

3. The method of claim 2, wherein output signals of the adaptive filter in the uplink communication period and the downlink communication period are the same.

4. The method of claim 2, further comprising:

tracking the gain ratio between the changing first gain and the second gain.

5. The method of claim 4, wherein the tracking of the gain ratio comprises:

calculating the difference between a first gain ratio compensated by the interference cancellation repeater and a second gain ratio changed according to the environment of the interference cancellation repeater, and tracking the gain ratio using the difference.

6. The method of claim 5, wherein the tracking of the gain ratio comprises:

tracking the gain ratio using fixed point iteration.

7. The method of claim 6, wherein the fixed point iteration is performed by reflecting a convergence constant on the difference in gain ratio.

8. The method of claim 7, wherein the convergence constant has a value greater than 0 and less than 1.

9. The method of claim 6, wherein the fixed point iteration is performed by using a coefficient vector at a point at which the uplink communication period ends and a coefficient vector at a point at which the downlink communication period ends.

10. The method of claim 9, wherein a coefficient vector of the previous communication period among the uplink communication period or the downlink communication period is stored and used.

11. The method of claim 6, wherein the fixed point iteration is performed by selecting only a coefficient vector corresponding to a direct-feedback signal and using the selected coefficient vector.

12. The method of claim 4, wherein the tracking of the gain ratio and the setting of the compensation gain of the gain compensator differently are performed during a guard period existing between the uplink communication period and the downlink communication period.

13. A TDD-based interference cancellation repeater comprising:

a controller configured to set a compensation gain of a gain compensator differently in an uplink communication period and a downlink communication period based on a gain ratio between a first gain corresponding to an overall gain of an uplink communication path and a second gain corresponding to an overall gain of a downlink communication path, and to set an optimal coefficient of an adaptive filter in the uplink communication period and an optimal coefficient of the adaptive filter in the downlink communication period the same based on the set compensation gain of the gain compensator; and a subtractor configured to remove an interference signal in the uplink communication period or the downlink communication period according to the set optimal coefficient of the adaptive filter.

14. The interference cancellation repeater of claim 13, further comprising:

an adaptive filter generating a predicted interference signal according to the set optimal coefficient of the adaptive filter, wherein the subtractor subtracts the predicted interference signal from an uplink communication signal or a downlink communication signal.

15. The interference cancellation repeater of claim 13, wherein the controller sets the compensation gain and the optimal coefficient of the adaptive filter based on synchronization information detected by a sync detector.

\* \* \* \* \*